No. 862,632. PATENTED AUG. 6, 1907.
H. A. GRAFE.
VEHICLE SPRING.
APPLICATION FILED MAR. 28, 1906.
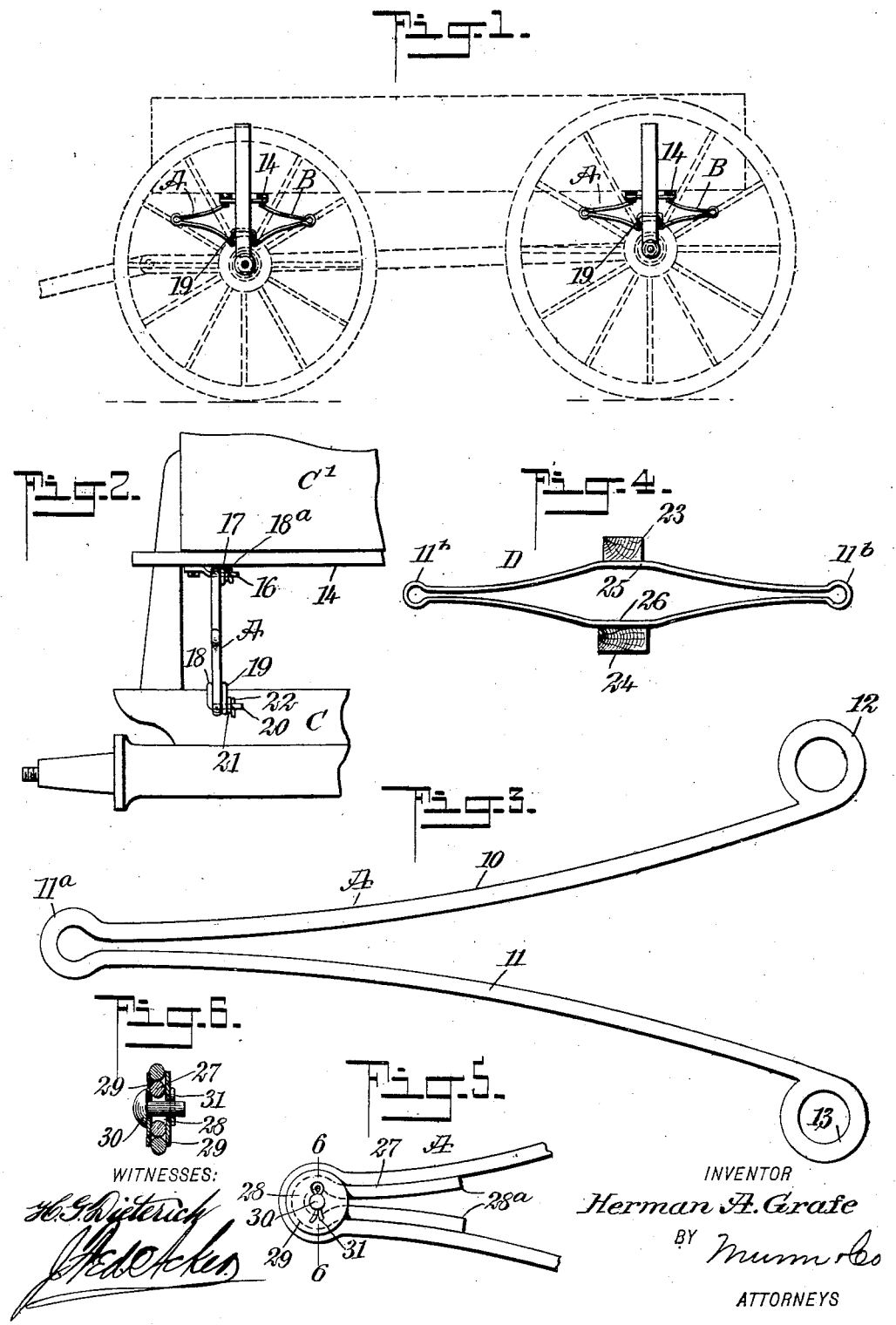
INVENTOR
Herman A. Grafe
BY Munn & Co.
ATTORNEYS

UNITED STATES PATENT OFFICE.

HERMAN A. GRAFE, OF NEWBERG, OREGON.

VEHICLE-SPRING.

No. 862,632.  Specification of Letters Patent.  Patented Aug. 6, 1907.

Application filed March 28, 1906. Serial No. 308,457.

*To all whom it may concern:*

Be it known that I, HERMAN A. GRAFE, a citizen of the United States, and a resident of Newberg, in the county of Yamhill and State of Oregon, have invented a new and Improved Vehicle-Spring, of which the following is a full, clear, and exact description.

The purpose of the invention is to provide a spring for vehicles which will be light, yet strong, and capable of ready and convenient attachment to the bolster or axle and to the body of the vehicle.

Another purpose of the invention is to provide a spring which will be elastic under a light load, and which under a heavy load will be self-reinforcing, and while the spring may be forced down to the bolster one member will so support the other that the spring will not have a tendency to break, and wherein even under such conditions portions of the springs will still remain reasonably elastic.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a side elevation of the improved springs and a side elevation of a vehicle in dotted lines to which the springs are applied; Fig. 2 is a front elevation of a portion of an axle, bolster and wagon body and the improved springs applied; Fig. 3 is an enlarged side elevation of one section of the improved springs; Fig. 4 is a side elevation of a modified form of spring; Fig. 5 is a side elevation of an outer end of a further modified form of spring; and Fig. 6 is a vertical section taken practically on the line 6—6 of Fig. 5.

The improved spring is made in two sections A and B, one section being an exact counterpart of the other, and one of the said sections, the section A, is illustrated in detail in Fig. 3.

The sections of the spring are made from bar metal, steel for example of desired thickness and width, and the metal is bent to form an upper member 10 and a lower member 11, connected at their outer ends by an open loop or segmental member 11$^a$. The members 10 and 11 in the normal position of the spring diverge at their free ends, and an eye 12 is formed at the inner or free end of the member 10 and a corresponding eye 13 is formed at the inner or free end of the member 11, the eyes extending from the outer longitudinal edges of said members. Both of the members 10 and 11 have the same curvature, but as stated in opposite directions, which curvature is on the arc of a 70 inch circle. These springs may be attached to the bolster C and the body C' of the vehicle in any suitable or approved manner; preferably, however, the attachment is made as is shown in Figs. 1 and 2, wherein sills 14 are secured to the bottom of the vehicle body, and bracket arms 16 are made to extend from the said sills in substantially a horizontal position but with more or less of a tip, and these bracket arms are passed through the upper eyes 12 of the sections A and B of a spring, and then a washer 17 is placed on the bracket arms and a cotter pin 18$^a$ is passed through said bracket arms, to prevent the sections of the springs from slipping from the bracket arms. Thus the necessary play is provided for at the upper inner end portions of the sections of the spring.

The lower inner end portions of the sections A and B of the spring are secured as follows: U-shaped clips 18 and 19 are secured to the bolster C in any suitable or approved manner, straddling the same, and one clip, the clip 18 for example, is provided with a horizontal member 20 at each end, which passes through the inner lower eyes 13 of the sections A and B of the springs and through eyes in the ends of the clips 19, then washers 21 are slipped on the members 20, and cotter pins 22 are passed through the said members, engaging with the said washers as is particularly shown in Fig. 2. In this manner the inner lower end portions of the springs have pivotal connection with the bolster or axle to which they may be attached.

In Fig. 4 I have illustrated a slightly modified form of the spring, in which it is in practically one piece, that is to say, the sections A and B in the form shown in Fig. 4, are connected at their inner ends, the upper member by a straight section 25 and the lower member by a corresponding section 26, and these sections 25 and 26 of the modified form of spring, designated as D, are shown attached to upper and lower sills 23 and 24. The detail construction of the end portions of the spring D is preferably the same as the construction of the sections A and B of the separated type of spring; and it may be here stated that the loops 11$^b$ at the ends of the spring D are in alinement with a point equidistant between the sections 25 and 26, to secure free and elastic action. This type of spring is designed for light vehicles.

When a spring of the character described is employed it is exceedingly elastic under a light weight; and under a heavy load the curved portions of the members of the sections of the springs are brought together so that one supports or reinforces the other, and at the same time the inner ends of the sections of the springs will diverge to such an extent that even when the straight parts referred to meet, the curved or inner ends of the springs will be supported sufficiently to form more or less of a cushion for the body of the vehicle.

In Figs. 5 and 6 I have illustrated the spring A as reinforced at its end portion by an inner auxiliary spring 27, having a terminal eye or open loop 28, and two leaves 28$^a$ extending therefrom. The open loop of the auxiliary spring lies close in the loop of the main spring, and the leaves of the auxiliary spring engage with the inner faces of the limbs of the main spring. Washers 29 are made to bear against the two open loops and a bolt 30 is passed through the washers and loops and is held in position by a cotter pin 31 or the like.

Having thus described my invention, I claim as new, and desire to secure by Letters Patent,—

A vehicle spring constructed in two sections, each section comprising upper and lower members connected at one end by an open loop and diverging at their free ends, said members being curved and lying with their convex surfaces adjacent, whereby pressure upon the free ends of the spring will move the members gradually into contact with each other from the connected end to the free end, an auxiliary shorter spring fitted to the inner contour of the loop, washers on each side of the loop, and a pin traversing the washers, whereby to secure the springs in place.

In testimony whereof I have signed my name to this specification in the presence of two subscribing witnesses.

HERMAN A. GRAFE.

Witnesses:
CLARENCE BUTT,
SEAMAN W. POTTER.